United States Patent [19]

Komori

[11] 4,202,432
[45] May 13, 1980

[54] CLUTCH DISK FOR USE IN AUTOMOBILE

[75] Inventor: Fukutaro Komori, Tokyo, Japan

[73] Assignee: Komori Seisakusho Co., Ltd., Tokyo, Japan

[21] Appl. No.: 859,479

[22] Filed: Dec. 12, 1977

[51] Int. Cl.² .............................................. F16D 69/02
[52] U.S. Cl. .......................... 192/107 M; 188/251 M; 192/107 R; 192/107C
[58] Field of Search .......... 192/107 M, 107 C, 107 R, 192/70.14; 188/73.2, 251 R, 251 A, 251 M

[56] References Cited

U.S. PATENT DOCUMENTS

| | | | |
|---|---|---|---|
| 2,135,126 | 11/1938 | Harwood | 192/70.14 X |
| 2,136,370 | 11/1938 | Bockius et al. | 192/107 M X |
| 2,985,273 | 5/1961 | Binder | 192/70.14 |
| 3,323,328 | 6/1967 | Montgomery | 192/70.14 X |
| 3,791,493 | 2/1974 | Yamaguchi et al. | 192/107 M X |

FOREIGN PATENT DOCUMENTS

| | | | |
|---|---|---|---|
| 1900459 | 1/1969 | Fed. Rep. of Germany | 188/251 M |
| 2733244 | 7/1977 | Fed. Rep. of Germany | 188/251 M |
| 789287 | 1/1958 | United Kingdom | 192/107 M |

Primary Examiner—Allan D. Herrmann
Attorney, Agent, or Firm—Bacon & Thomas

[57] ABSTRACT

In a clutch disk for use in an automobile, the improvement wherein a plurality of supporting plates are separately fastened to the periphery of a plate, and masses of organic friction material and masses of sintered metal friction material are alternately fixed to both surfaces of the supporting plates for forming the frictional sliding surface of the clutch disk.

17 Claims, 7 Drawing Figures

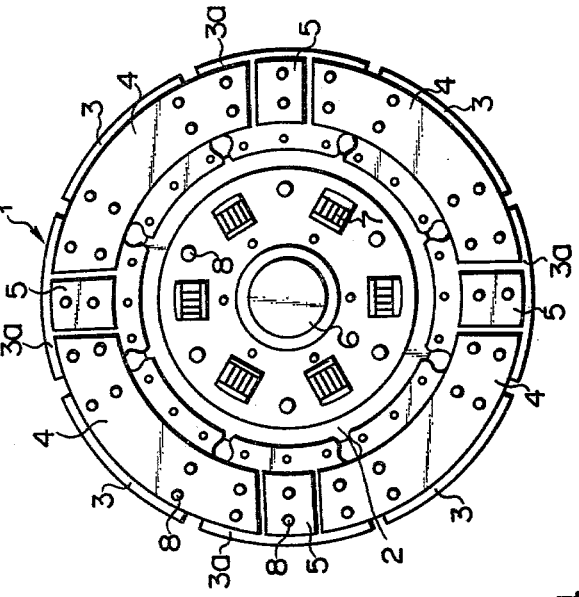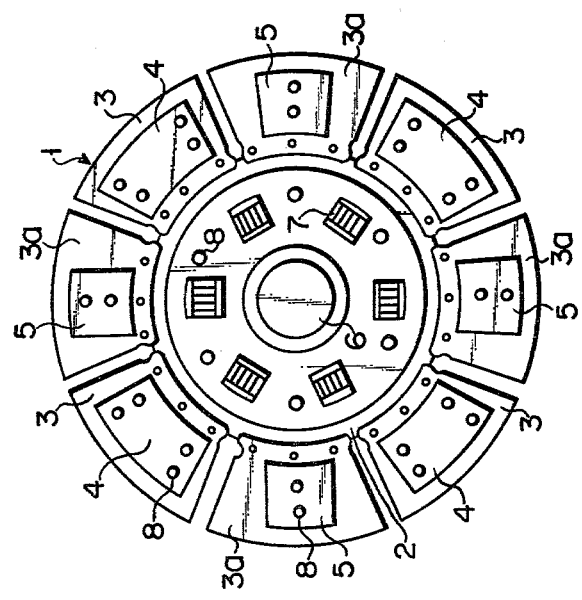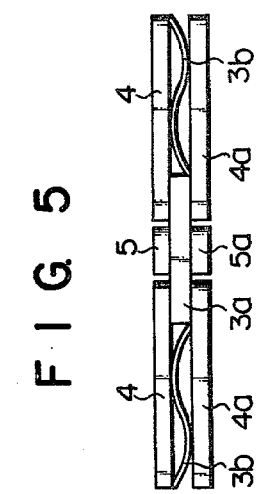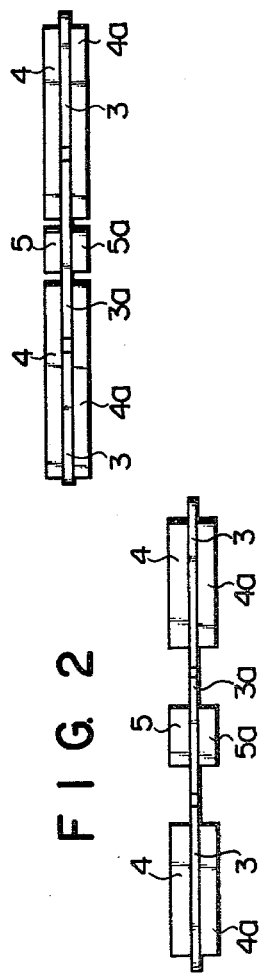

CLUTCH DISK FOR USE IN AUTOMOBILE

This invention relates to clutch disks for use in automobiles.

Because of traffic congestion resulting from the marked increase of vehicles in recent years, the clutch of an automobile is operated with extraordinary frequency and subjected to exceptionally high loads. Moreover, since additional signals as well as "Stop" and "Go slow" signs are being set up for the purpose of preventing the occurrence of traffic accidents, the frequencies of stopping or starting an automobile and of driving an automobile at reduced speed are increasing steadily. Furthermore, an unskilled driver often allows the clutch to slip unnecessarily. For these reasons, clutch disks tend to be used under severe conditions and become worn at an accelerated rate.

As the wear increases, not only the transmission of torque from the engine to the axle becomes difficult, but also the associated mechanisms and component parts become liable to break. Furthermore, if the clutch disk is to be repaired, the transmission gearbox must be disassembled and re-assembled. As in well known, this procedure requires many man-hours and great expenses owing to the location and construction of the mechanism.

The friction materials now in use for the manufacture of clutch disks are organic friction material having synthetic resin for its main component, or sintered metal friction material.

The former, or organic friction material, possesses a high friction coefficient but wears away at a high rate. However, it scarcely causes what is called slipping phenomena and clutch noises. Its price, in addition, is low. Sintered metal friction material, on the contrary, possesses a low friction coefficient and wears away at a low rate (that is, has excellent wear resistance), endures for a long period of time even when used under severe conditions, and has metallic properties including good thermal conductivity which permits frictional heat to escape to the outside and thereby prevents the occurrence of thermal crack (heat spot) in the mating members (that is, flywheel and pressure plate). However, it slips and noises frequently. Moreover, some supporting plates (or disk springs) to which masses of sintered metal friction material are fixed tend to be subjected to increased torques, so that breakage of such supporting plates may often occur. The reason is that the masses of sintered metal friction material fixed to the supporting plates vary in thickness within the tolerances and the torque is thus concentrated on the thickest ones. Furthermore, sintered metal friction material has the disadvantages of making a strong attack to the mating members (or pressure plate and flywheel) which are then ready to wear away and of being very high in price.

Inorganic mineral fibers such as asbestos and friction modifiers such as rubber powder, carbon black or silica powder are bound with an organic resin such as thermosetting phenolic resin to obtain an organic friction material.

The clutch disks heretofore in use had a friction material composed of either organic friction material or sintered metal friction material as characterized above. However, any of them involved a variety of problems attributable to the above-described disadvantages of these materials.

In order to solve such problems, it has been proposed to use a friction material composed of both sintered metal friction material and organic friction material. Such a friction material can be prepared, for example, by mounting a plurality of masses of sintered metal friction material on a metallic supporting member in mutually spaced relationship and then filling the gaps between the masses of sintered metal friction material with a layer of organically bound friction material having synthetic resin for its main component (see Japanese Patent Publication No. 13807/72).

As a result of the concomitant use of sintered metal friction material with organic friction material, the composite friction material thus obtained shows the advantages of having excellent wear resistance and of making a less strong attack on the mating members than any conventional friction material.

It is to be noted, however, that the composite friction material disclosed in Japanese Patent Publication No. 13807/72 is formed by inlaying organic friction material with sintered metal friction material and, therefore, lacks in elasticity. Thus, the frictional sliding surface of the clutch disk using this composite friction material may fail to be in intimate contact with the mating members.

In a clutch disk for use in an automobile according to this invention, the improvement wherein a plurality of supporting plates are separately fastened to the periphery of a plate, and masses of organic friction material and masses of sintered metal friction material are alternately fixed to both surfaces of the supporting plates for forming the frictional sliding surface of the clutch disk. On each side of the clutch disk, a mass of organic friction material or sintered metal friction material is fixed to a single supporting plate respectively. Alternatively, the lateral end portions of each mass of organic friction material may be extended and thereby engaged with and fixed to the two supporting plates for sintered metal friction material which are adjacent to the supporting plate for organic friction material.

The clutch disk of this invention combines the merits of organic friction material with those of sintered metal friction material because its friction material is composed of both types of materials. Specially, its friction material has excellent elasticity because the organic friction material and the sintered metal friction material are fixed to supporting plates disposed in mutually spaced relationship, as contrasted with any conventional clutch disk in which the composite friction material is formed by inlaying organic friction material with sintered metal friction material. Thus, the clutch disk of the invention using a composite friction material as described above can come into very intimate contact with the mating members.

This invention can be more fully understood from the following detailed description when taken in conjunction with the accompanying drawings, in which:

FIG. 1 is a plan view of a clutch disk embodying this invention;

FIG. 2 is a developed side view of the clutch disk of FIG. 1;

FIG. 3 is a plan view of another clutch disk embodying this invention;

FIG. 4 is a developed side view of the clutch disk of FIG. 3;

Figure 6:
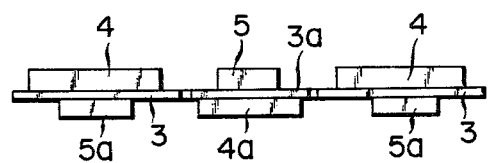
Figure 7:
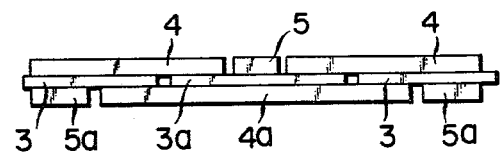

FIG. 5 is a developed side view of a clutch disk similar to that shown in FIGS. 3 and 4 except that the supporting plates for organic friction material are in the form of corrugated plates; and FIGS. 6 and 7 are similar to FIGS. 2 and 4, but show a clutch plate with sintered metal friction material on the face of the clutch plate opposite from the organic friction material.

Some exemplary clutch disks embodying this invention will now be described with reference to the drawings, wherein like reference numerals designate like elements.

Referring first to FIGS. 1 and 2, there is shown a clutch disk 1 in accordance with this invention. In this clutch disk 1, a plurality of supporting plates 3 and 3a are alternately fastened to the periphery of plate 2, and masses 4, 4a of organic friction material and masses 5, 5a of sintered metal friction material are fixed to both surfaces of supporting plates 3 and 3a, respectively. In these figures, reference numeral 3 designates supporting plates for organic friction material and reference numeral 3a does supporting plates for sintered metal friction material. Accordingly, when seen in a plan view such as FIG. 1, masses 4 of organic friction material and masses 5 of sintered metal friction material are alternatively fixed to the supporting plates disposed in mutually spaced relationship. In this embodiment, as shown in FIG. 2, each of supporting plates 3 has a pair of masses 4, 4a of organic friction material fixed to both surfaces thereof in opposed relationship with each other and each of supporting plates 3a has a pair of masses 5, 5a of sintered metal friction material fixed to both surfaces thereof in opposed relationship with each other. It is also possible, however, to make an arrangement so that each of supporting plates 3 has a mass 4 of organic friction material and a mass 5a of sintered metal friction material fixed to both surfaces thereof in opposed relationship with each other and, therefore, each of supporting plates 3a has a mass 5 of sintered metal friction material and a mass 4a of organic friction material fixed to both surfaces thereof in opposed relationship with each other. The above arrangement is shown in FIG. 6 of the drawings.

In FIG. 1, reference numerals 6, 7 and 8 designate a spline, cushoning rubber or spring, and rivets, respectively.

Referring now to FIGS. 3 and 4, there is shown another clutch disk in accordance with this invention. This clutch disk is constructed in substantially the same manner as that shown in FIGS. 1 and 2, except that the lateral end portions of each mass 4 of organic friction material are extended and thereby engaged with and fixed to the two supporting plates 3a, 3a for sintered metal friction material which are adjacent to the supporting plate 3 for organic friction material. In this embodiment, as shown in FIG. 4, each of supporting plates 3 has a pair of masses 4, 4a of organic friction material fixed to both surfaces thereof in opposed relationship with each other and each of supporting plates 3a has a pair of masses 5, 5a of sintered metal friction material fixed to both surfaces thereof in opposed relationship with each other. Just as described above, and as shown in FIG. 7, it is also possible to make an arrangement so that each of supporting plates 3 has a mass 4 of organic friction material and a mass 5a of sintered metal friction material fixed to both surfaces thereof in opposed relationship with each other and, therefore, each of supporting plate 3a has a mass 5 of sintered metal friction material and a mass 4a of organic friction material fixed to both surfaces thereof in opposed relationship with each other.

In the embodiment shown in FIGS. 3 and 4, supporting plates 3 for organic friction material and supporting plates 3a for sintered metal friction material are both in the form of flat plates. As shown in FIG. 5, however, supporting plates 3a for organic friction material may be replaced by supporting plates 3b which are in the form of corrugated plates rather than flat plates. This type of supporting plates 3b further enhances the elasticity of the composite friction material, thereby enabling the frictional sliding surface of clutch disk to come into more intimate contact with the mating members.

In the clutch disk of this invention, the masses of sintered metal friction material and the masses of organic friction material are preferably fixed to the supporting plates in such a manner that the surfaces of the masses of organic friction material are elevated above those of the masses of sintered metal friction material by 0.1 to 0.2 millimeters.

The above-described construction makes the clutch disk of this invention appreciably cheaper, as compared with any conventional clutch disk whose friction material is composed of sintered metal friction material alone. In operation, the clutch disk is brought into sliding contact with the flywheel and the pressure plate. The wear debris of sintered metal friction material adheres to the surfaces of the organic friction material and thereby enhances their durability, so that the clutch disk of this invention can be used for a much longer period of time than any conventional clutch disk whose friction material is composed of organic friction material alone. Moreover, the concomitant use of sintered metal friction material having good thermal conductivity permits the frictional heat produced in the mating members (or flywheel and pressure plate) to escape to the outside and thereby prevents the occurrence of thermal crack therein. In conventional clutch disks whose friction material is composed of sintered metal friction material alone, an individual supporting plate has a single mass of sintered metal friction material fixed to each surface thereof. Especially when a large number of supporting plates (for example, 7 to 12 supporting plates), are used, the torque tends to be concentrated, as described above, on some definite masses of sintered metal friction material and thereby cause breakage of the bases of the supporting plates to which those masses of sintered metal friction material are fixed. In accordance with this invention, the concomitant use of organic friction material prevents the occurrence of torque concentration and supporting plate breakage as described above. Especially in the embodiments shown in FIG. 3 to 5 wherein the lateral end portions of each mass of organic friction material are engaged with and fixed to the two adjacent supporting plates for sintered metal friction material, the occurrence of breakage as described above is prevented to a significant extent.

Furthermore, similarly to the clutch disk disclosed in Japanese Patent Publication No. 1387/72, the clutch disk of this invention uses a friction material composed of both organic friction material and sintered metal friction material. However, the composite friction material used in this invention comprises masses of organic friction material and masses of sintered metal friction material fixed to individual supporting plates disposed in mutually spaced relationship (even in the embodiments shown in FIGS. 3 to 5 wherein the lateral end portions of each mass of organic friction material are fixed to the two adjacent supporting plates for sintered metal friction material, the greater part of each mass of organic friction material is fixed to a supporting plate for organic friction material spaced from those supporting plates for sintered metal friction material) and thereby has excellent elasticity, as contrasted with the composite friction material disclosed in Japanese Patent Publication No. 13807/72 wherein organic friction material is combined with sintered metal friction material to form a whole. Thus, the clutch disk of this invention using such a composite friction material can come into very intimate contact with the mating members.

What is claimed is:

1. In a clutch disk for use in an automobile, the improvement wherein a plurality of supporting plates are separately fastened to the periphery of a plate, and masses of organic friction material and masses of sintered metal friction material are alternately fixed to both surfaces of said supporting plates for forming the frictional sliding surface of said clutch disk.

2. A clutch disk as claimed in claim 1 wherein, on each side of said clutch disk, a mass of organic friction material or sintered metal friction material is fixed to a single supporting plate respectively.

3. A clutch disk as claimed in claim 2 wherein said supporting plates are in the form of flat plates.

4. A clutch disk as claimed in claim 1 wherein, on each side of said clutch disk, alternate ones of said supporting plates have masses of organic friction material fixed thereto and the remaining ones of said supporting plates have masses of sintered metal friction material fixed thereto and wherein the lateral end portions of each mass of organic friction material are engaged with and fixed to the two supporting plates for sintered metal friction material which are adjacent to the supporting plate for organic friction material.

5. A clutch disc as claimed in claim 4 wherein the supporting plates for organic friction material and the supporting plates for sintered metal friction material are both in the form of flat plates.

6. A clutch disk as claimed in claim 4 wherein the supporting plates for organic friction material are in the form of corrugated plates and the supporting plates for sintered metal friction material are in the form of flat plates.

7. A clutch disk as claimed in claim 1 wherein each of said supporting plates has a pair of masses of organic friction material or masses of sintered metal friction material fixed to both surfaces thereof in opposed relationship with each other.

8. A clutch disk as claimed in claim 2 wherein each of said supporting plates has a pair of masses of organic friction material or masses of sintered metal friction material fixed to both surfaces thereof in opposed relationship with each other.

9. A clutch disk as claimed in claim 3 wherein each of said supporting plates has a pair of masses of organic friction material or masses of sintered metal friction material fixed to both surfaces thereof in opposed relationship with each other.

10. A clutch disk as claimed in claim 4 wherein each of said supporting plates has a pair of masses of organic friction material or masses of sintered metal friction material fixed to both surfaces thereof in opposed relationship with each other.

11. A clutch disk as claimed in claim 5 wherein each of said supporting plates has a pair of masses of organic friction material or masses of sintered metal friction material fixed to both surfaces thereof in opposed relationship with each other.

12. A clutch disk as claimed in claim 6 wherein each of said supporting plates has a pair of masses of organic friction material or masses of sintered metal friction material fixed to both surfaces thereof in opposed relationship with each other.

13. A clutch disk as claimed in claim 1 wherein each of said supporting plates has a mass of organic friction material and a mass of sintered metal friction material fixed to both surfaces thereof in opposed relationship with each other.

14. A clutch disk as claimed in claim 2 wherein each of said supporting plates has a mass of organic friction material and a mass of sintered metal friction material fixed to both surfaces thereof in opposed relationship with each other.

15. A clutch disk as claimed in claim 3 wherein each of said supporting plates has a mass of organic friction material and a mass of sintered metal friction material fixed to both surfaces thereof in opposed relationship with each other.

16. A clutch disk as claimed in claim 4 wherein each of said supporting plates has a mass of organic friction material and a mass of sintered metal friction material fixed to both surfaces thereof in opposed relationship with each other.

17. A clutch disk as claimed in claim 5 wherein each of said supporting plates has a mass of organic friction material and a mass of sintered metal friction material fixed to both surfaces thereof in opposed relationship with each other.

* * * * *